United States Patent [19]

Riihinen

[11] Patent Number: 4,485,540
[45] Date of Patent: Dec. 4, 1984

[54] ROLL MAGNETICALLY COMPENSATED AND/OR CONTROLLED OF ITS DEFLECTION

[75] Inventor: Jaakko Riihinen, Jyväskylä, Finland

[73] Assignee: Valmet OY, Finland

[21] Appl. No.: 361,388

[22] Filed: Mar. 24, 1982

[30] Foreign Application Priority Data

Apr. 8, 1981 [FI] Finland .................................. 811078

[51] Int. Cl.$^3$ ........................ B21B 13/02; B21B 13/14
[52] U.S. Cl. ................................................ 29/116 AD
[58] Field of Search ......... 29/113 R, 113 AD, 116 R, 29/116 AD, 123, 124, 130; 100/168, 917

[56] References Cited

U.S. PATENT DOCUMENTS 4,062,097 12/1977 Riihinen ......................... 29/116 AD
4,301,582 11/1981 Riihinen ......................... 29/116 AD

*Primary Examiner*—Howard N. Goldberg
*Assistant Examiner*—Timothy V. Eley
*Attorney, Agent, or Firm*—Steinberg & Raskin

[57] ABSTRACT

A roller used as a press or calender roller in a paper machine is compensated for deflection and end-loaded. The roller has a stationary axle with spaced opposite ends at which the roller is loaded and a cylindrical shell rotatably mounted on the axle. The axle has a magnetic core portion within the shell having pole shoes spaced from the shell by air gaps and magnetizing coils of electrical conductors thereon at corresponding ones of the pole shoes. The coils produce a magnetomotive force and are positioned in a manner whereby magnetic flux passing through the air gaps between the pole shoes and the shell creates a compensating force field between the shell and the magnetic core. The roller has an inner part of the shell consisting of a stack of sheets of magnetically well-conductive material separated from each other by electrical insulation thereby reducing eddy current losses.

17 Claims, 4 Drawing Figures

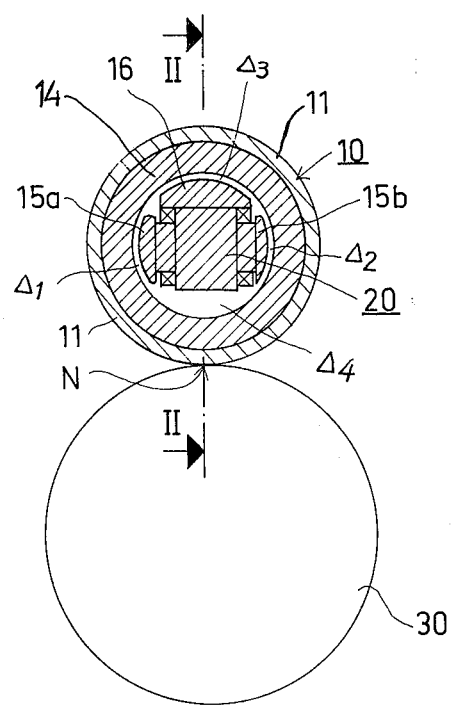
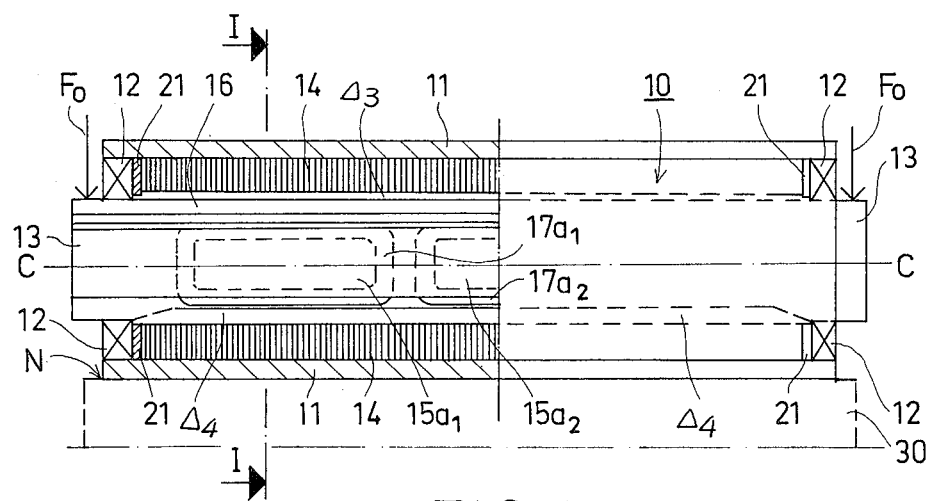

ROLL MAGNETICALLY COMPENSATED AND/OR CONTROLLED OF ITS DEFLECTION

BACKGROUND OF THE INVENTION

The present invention relates to a roller magnetically compensated for deflection. More particularly, the invention relates to an end-loaded roller such as a press roller or calender roller of a paper machine. The roller has a non-rotating axle having spaced opposite ends at which said roller is loaded and a cylindrical shell rotatably mounted on the axle. The axle has a magnetic core portion within the shell. The magnetic core portion has pole shoes spaced from the shell by air gaps and magnetizing coils thereon at corresponding ones of the pole shoes. The coils produce a magnetomotive force and are positioned in a manner whereby magnetic flux passing through the air gaps between the pole shoes and the shell creates a compensating force field between the shell and the core.

U.S. Pat. No. 3,456,582 discloses an electromagnetic press nip defined by two rollers, wherein the nip pressure is produced by a roller having permanent magnets inside it and a roller of smaller diameter which bends with comparative ease. The magnetic flux path is closed substantially axially in these rollers through the roller with the smaller diameter. The contact line between these rollers functions as the air gap. Magnetic forces develop at the contact line between the rollers and the web passes between said rollers at said contact line.

A roller of the aforedescribed type is also disclosed in "Wochenblatt für Papierfabrikation, Biberach März 1978. Nr. 5, p. 194 (Baumgarten, H. L.: Über die thermo-mechanische Oberflächenbehandlung und Kalibrierung von Papier und Karton)". The rollers disclosed in these references are not loaded at their ends and the nip pressure is not produced by the loading forces, but merely by magnetic forces.

The roller of the invention, when defining a nip together with an opposing roller, is intended for the pressing treatment of web-shaped materials. It is commonly understood that when such rollers are loaded at their ends they undergo such deflection that the line pressure is higher in the marginal parts of the press or calender nip than in the central area. Attempts made in an effort to avoid this drawback include cambering of the rollers, which is making the roller shell barrel-shaped, beforehand. However, conventional cambered rollers permit the achievement of uniform line pressure at one specific load, only. "Camber" rollers have been developed in order to eliminate this drawback.

"Camber" rollers are exemplified, for example, by the "Küsters" roller, disclosed in U.S. Pat. No. 2,908,964. In the "Küsters" roller, a chamber containing fluid under pressure is provided between the stationary roller axle and the rotary roller shell at a given sector. Regulation of the pressure of the fluid in the chamber permits the deflection of the roller to be compensated. The drawbacks of the Küsters roller are sealing problems and pressurized fluid leakage resulting from such problems. Another drawback of the Küsters roller is its sluggish response to pressure changes. The speed of ascent is about 30 seconds and the discharge speed is about 10 seconds. As a result, considerable quantities of paper which must be rejected may be produced in a paper machine, due to pressure changes, for example.

Deflection-compensated "CC" rollers, of the Beloit Co., are also known in the art. CC rollers have pressing shoes which rub against the inner surface of the roller shell. The CC roller, similarly to the Küsters roller, has the drawbacks of pressure fluid sealing problems. The CC roller also has the drawback of comparative difficulty in providing adjustments which are asymmetrical in the axial direction of the roller.

In the rollers heretofore mentioned, the compensating forces are produced by pressure chambers of friction shoes, which require a high degree of smoothness of the inner surface of the roller shell. This involves higher roller manufacturing costs.

Another drawback of the aforementioned rollers of the prior art is the increased need for power to rotate the roller, resulting from the sealing elements and other friction elements.

Press rollers acting in accordance with electromagnetic forces are known in the art. An object of the invention is to further develop exactly this type of roller. Reference may be made in this connection to U.S. Pat. No. 3,456,582. This patent discloses a roller which differs from the roller of the invention in the design and implementation of details and also that the roller of this patent is not loaded at its ends.

Regarding the state of art associated with the invention, reference is made to German printed publication DT-OS No. 1,761,641. This publication discloses a roller which is deflection-compensated by permanent magnets mounted both on the stationary axle and the rotating shell. The compensating forces are controlled by axial adjustment of the roller axle and roller shell with reference to each other, thereby changing the mutual positioning of said shell and axle and thus achieving control of the compensating forces.

Regarding the state of art associated with the invention, reference is also made to U.S. Pat. No. 3,489,079, which is the equivalent of Finnish patent application No. 2283/67. The roller disclosed in this patent has magnetic shoes disposed in "V" configuration and producing attractive forces at the air gaps between the two poles of said magnetic shoes and the inner shell of said roller.

Reference is made to Finnish Pat. Nos. 52 394 and 58 662 of the present inventor. These patents are equivalent to U.S. Pat. Nos. 4,062,097 and 4,301,582, respectively. The roller of Finnish Pat. No. 58 662 has a magnetic core with three pole shoes in its cross-section. The magnetic core has magnetizing coils which create a magnetomotive force, so that the magnetic flux producing the actual compensating force field passes through the centermost pole shoe of said core and is closed back to said core through the roller shell and two substantially opposed pole shoes of said core.

The general object of the invention is to further develop the aforementioned rollers and, more specifically, the magnetic roller disclosed in Finnish Pat. No. 58 662. The specific objects of Finnish Pat. Nos. 52 394 and 58 662 was to provide a roller with faster control characteristics than previously, compared to the Küsters and CC rollers. An additional object of these Finnish patents was to provide a roller of lower cost which operates with lower drive power, compared to the aforementioned mechanically and hydraulically compensated rollers. This is accomplished due to the fact that no particular smoothness requirements are imposed on the inner surface of the roller shell because there is no direct contact and no need for sealing.

When a rotating shell roller is used, for example, as disclosed by Finnish Pat. No. 58 662, said shell consists of a cylindrical part of continuous material such as, for example, of cast steel, through which the magnetic fluxes between the poles of the stationary magnetic core are closed, and the rotation of said shell produces considerable eddy current losses, even if the magnetizing current is direct current. It is well known, of course, that the eddy current losses increase with the square of the frequency. In this case, the eddy current losses increase with the square of the speed of rotation. Even if the magnetizing current is direct current, a flux is produced in the shell which changes at different points, due to its rotation.

SUMMARY OF THE INVENTION

The principal object of the invention is to provide a magnetically compensated and/or controlled roller of the type disclosed in the aforementioned Finnish patents and U.S. Pat. No. 3,489,079, or a roller of similar type, in which eddy current losses are reduced to a fraction of the equivalent losses incurred in rollers of the prior art.

This object, of reducing eddy current losses, and others which will become apparent hereinafter, are achieved by making the inner part of the rotatable shell of the roller of a stack of sheets of magnetically well-conductive material separated from each other by electrical insulation.

Eddy current losses are substantially reduced by making the inner part of the rotatable shell of the roller a cylindrical part consisting of transformer sheet material, preferably a stack of radially priented sheet rings.

BRIEF DESCRIPTION OF THE DRAWINGS

For a fuller understanding of the invention, reference is had to the following description, taken in connection with the accompanying drawings, in which:

FIG. 1 is a cross-section of an embodiment of a magnetic roller of the invention, said roller defining a nip with an opposing roller, and is a view, taken along the lines I—I, of FIG. 2;

FIG. 2 is an axial section, taken along the lines II—II, of FIG. 1;

DESCRIPTION OF PREFERRED EMBODIMENTS

Figure 4:
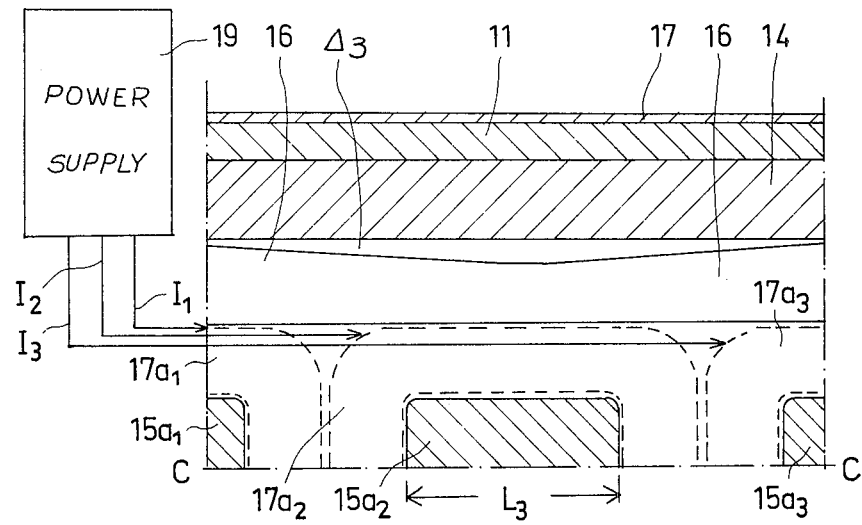
FIG. 4 is a partial axial section of FIG. 3.

The electromagnetically compensated roller 10 shown in the Figs. comprises a cylindrical load-bearing shell part 11. A cylindrical part 14 is provided in the shell part 11 and consists of magnetically well-conductive material. A cover 17 is provided on the shell part 11. The provision of the cover 17 is determined by each particular application, since said cover is not always necessary. The roller 10 has a stationary axle 20, which is loaded at the ends 13 thereof. The load-imposing forces are indicated by arrows $F_0$ in FIG. 2. These forces, in combination with the proper weight of the roller 10, produce the required nip pressure of the nip N. The roller 10 and an opposing roller 30 together define the nip N. The rotating shell 11, 14, 17 of the roller is mounted on bearings 12. The axle 20 has a center line C—C (FIGS. 2 and 4).

Figure 3:
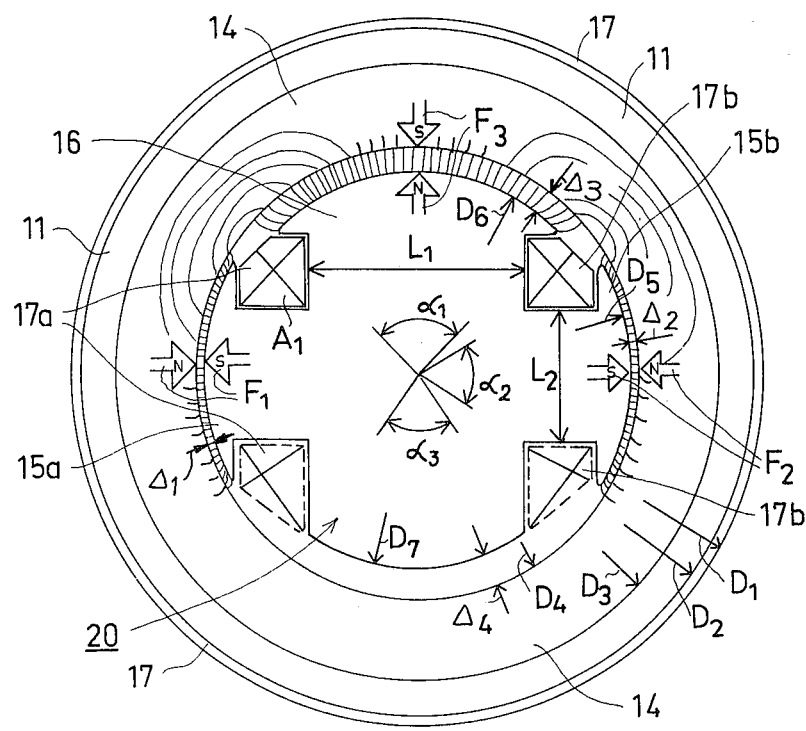
FIG. 3 is a view, on an enlarged scale, of the cross-section of the embodiment of FIGS. 1 and 2, showing the path of the magnetic flux and the generation of forces in different air gaps.

The stationary axle 20 of the roller comprises magnetically conductive material shaped as a magnetic core having a substantially X or T-shaped cross-section (see FIGS. 3 and 1 respectively). The magnetic core 20 has pole shoes 15a and 15b provided with parallel magnetizing coils 17a and 17b, respectively, of electrical conductors, and a common pole shoe 16. The pole shoe 16 is wider than the pole shoes 15a and 15b, and may also be provided with a magnetizing coil, if required, although such coil is not shown in the Figs. The magnetic core 20 is placed inside the rotating innermost cylindrical part 14, so that air gaps and $\Delta_1$ and $\Delta_2$ are formed between the opposing pole shoes 15a and 15b and the inner surface of said part and an air gap $\Delta_3$ is formed adjacent the pole shoe 16 and the inner surface of said part.

In accordance with the invention, the rotating cylindrical shell of the roller 10 consists of at least two parts. These are the shell part 11 consisting of steel, or other mechanically strong material, which serves as the load-bearing frame of said shell, and the magnetically well-conductive inner cylindrical part 14. In accordance with the invention, the inner cylindrical part 14 is composed of side-by-side stacked, radially oriented transformer sheet rings, mutually insulated in a known manner, such as, for example, a coat of varnish. Eddy current losses are substantially lower than in any equivalent roller of the prior art, due to the structure of the stack of sheets of the inner cylindrical part 14 and the type of material used.

The magnetically well-conductive inner cylindrical part 14 is made, for example, by stacking transformer sheet rings inside the shell 11 and clamping them between a pair of end rings 21 to form a compact stack. The outer surface of the stack or stacks of sheets of the cylindrical part 14 may be machined. The stack of sheets of the cylindrical part 14 may be affixed inside the shell 11 by a press joint, for example, by first heating said shell and permitting it to cool with the stack of sheets constituting the part 14 inside said shell.

The thickness of each of the transformer sheet rings of the cylindrical part 14 varies in accordance with the rotary frequency, in a range from 0.5 to 10 mm, for example. When the frequency of rotation is about 10 Hz, for example, the thickness of each of the transformer sheet rings is preferably about 2 to 3 mm, and when the frequency of rotation is about 50 Hz, the thickness of each sheet is about 1 mm or less.

Since no varying magnetic flux occurs in the core part 20, the structure of said part may consist of a massive steel of suitable quality. It should also be taken into account in the structural design of the core part 20 that it serves as an axle which is required to take up deflections of the roller 10. The shell, coils and axle may be cooled, if required, by air or liquid flowing through the roller in axial direction. The rotating shell part 11, 14, 17 does not usually need to be specially cooled.

A non-restrictive example of the dimensioning of a magnetic press roller 10 of the invention is as follows:

The outer diameter $D_1$ of the roller = 955 mm.

The diameter $D_2$ of the roller at the cover 17 = 930 mm.

The outer diameter $D_3$ of the stack of sheets 14 = 830 mm.

The inner diameter $D_4$ of the shell = 610 mm.

The outer diameter $D_5$ of the axle 20 = 590 mm.

The length of the nip N = 9250 mm.

The maximum linear load = 120 kN/m.

The maximum deflection compensating force = 1300 kN.

The diameter $D_6$ of the third pole shoe $16 = 540$ mm.

The inner diameter $D_7$ of the axle $20 = 530$ mm.

The distance $L_1$ between the magnetizing coils $17a$ and $17b = 300$ mm.

The inner diameter $L_2$ of each of the magnetizing coils $17a$ and $17b = 180$ mm.

The thickness of each of the air gaps $\Delta_1$ and $\Delta_2 = 10$ mm.

The thickness of the air gap $\Delta_3 = 35$ mm.

The cross-sectional area $A_1$ of each of the magnetizing coils $17a$ and $17b$ is approximately 80 cm$^2$.

The width $L_3$ of each of the pole shoes $15a$ and $15b = 1120$ mm.

$\alpha_1 \approx 90°$
$\alpha_2 \approx 60°$
$\alpha_3 \approx 70°$

With regard to the dimensioning of the magnetic circuit, it is observed that the requisite flux density for the maximum deflection compensating force mentioned, 1300 kN, is $$\phi_1 = A_2 \cdot B = 0.27 \ Vs \cdot A_2 = 0.30 m^2.$$

The number of ampere-turns of one magnetizing coil $17a$, $17b$ is obtainable by calculation and is approximately 34 kA. The area $A_1$ of approximately 80 cm$^2$ is sufficient for the required coil accommodation. The copper losses $P_{cu}$ are found to be about 2.7 kW/m and the eddy current losses at the rotational speed of 6 Hz and a flux density of 1.5 T in a sheet of the stack of transformer sheets are found to be about 0.8 kW per meter of roller length. These eddy current losses are only about 10% of the eddy current losses of equivalent magnetic rollers of the prior art.

FIG. 3 outlines the path of the magnetic flux in the air gaps $\Delta_1, \Delta_2, \Delta_3$ of the magnetic core 20 and the cylindrical part 14 of the roller. The distribution of magnetic flux, as shown in FIG. 3, produces forces $F_1$, $F_2$ and $F_3$ schematically indicated by arrows. The active force $F_3$ is that which, as it acts at the air gap $\Delta_3$, compensates for the deflection resulting from the proper weight of the roller 10 and the load $F_0$. The force $F_3$ regulates the distribution of line pressure, as desired, in the nip N between the rollers 10 and 30.

An isolation gap $\Delta_4$ remains beneath the magnetic core 20 and directs the magnetic flux mainly through the air gaps $\Delta_1$, $\Delta_2$ and $\Delta_3$.

As shown in FIG. 4, the pole shoe 16 which produces the main compensating force $F_3$, extends over the entire breadth of the shell 11, 14, 17 of the roller 10. In contrast, there are several pieces of pole shoes $15a$ and $15b$ in parallel and these are provided with individual magnetizing coils $17a$ and $17b$, respectively. The pole shoes $15a_1$, $15a_2$ and $15a_3$ and the corresponding magnetizing coils $17a_1$, $17a_2$ and $17a_3$, respectively, are shown in FIG. 4.

The compensation and regulation of deflection, and thereby the distribution of line pressure in the nip N, is electrically controllable by adjusting the intensities and interrelations of the magnetizing currents fed to the magnetizing coils $17a_1 \ldots 17a_n$ and $17b_1 \ldots 17b_n$ of n parallel pole shoes $15a_1 \ldots 15a_n$ and $15b_1 \ldots 15b_n$, respectively. A power supply 19 (FIG. 4) of any suitable type, produces magnetizing currents $I_1$, $I_2$ and $I_3$ and feeds said currents to the corresponding magnetizing coils. In certain instances, such control is sufficient when the various magnetizing coils 17 are connected in series and the intensity of the current in the group of coils is controlled. Either direct current or alternating current may be used to energize the magnetizing coils. If direct current is used, controlled rectifiers of any suitable known type are used. Since the magnetizing current is only transmitted to the stationary magnetic core 20, no slip rings or equivalent equipment are required.

Although the magnetic core 20 has hereinbefore been described as stationary, it should be understood that, if necessary, said core may be arranged to be rotatable about the axis of rotation C—C of the roller, so that the location of the field of action of the compensating forces may be changed, as desired. It is also conceivable that the thickness or width of the air gaps, and especially that of the air gap $\Delta_3$ be arranged to be adjustable within certain limits. Each of air gaps $\Delta_1$ and $\Delta_2$ may also have a minimum thickness within certain limitations imposed by accuracy of manufacture and safety allowances. Since the pole shoes $15a$, $15b$ and 16 are not in direct contact with the inner surface of the cylindrical part 14, there are no special requirements concerning the smoothness of said inner surface.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A roller used as a press or calender roller in a paper machine, said roller being compensated for deflection and end-loaded, and having a stationary axle having spaced opposite ends at which said roller is loaded, and a cylindrical shell rotatably mounted on said axle, said shell including an inner part, said axle having a magnetic core portion within said shell, said magnetic core portion having pole shoes spaced from said shell by air gaps, and magnetizing coils of electircal conductors thereon at corresponding ones of said pole shoes, said coils producing a magnetomotive force and being positioned in a manner whereby magnetic flux passing through the air gaps between said pole shoes and said shell created a force field between said shell and said magnetic core, said inner part of said shell bounding said air gaps, said roller comprising said inner part of said shell consisting of a stack of sheets of magnetically well-conductive material separated from each other by electrical insulation, thereby reducing eddy current losses.

2. A roller as claimed in claim 1, wherein magnetic flux creating the compensating force field principally passes through said inner part of said shell and said stack of sheets of said inner part comprises transformer sheet rings positioned substantially parallel to a radial plane of said roller.

3. A roller as claimed in claim 2, wherein said shell has an outer part and said inner part of said shell is substantially coaxially mounted in said outer part.

4. A roller as claimed in claim 3, wherein said stack of transformer sheet rings are affixed in position within said outer part by a press joint formed by heating said outer part and permitting said outer part to cool around said stack.

5. A roller as claimed in claim 3, wherein said outer part substantially determines the strength of said shell and consists of mechanically strong material having a radial thickness equal to approximately half the radial thickness of said stack of transformer sheet rings.

6. A roller as claimed in claim 3, wherein said outer part consists of cast steel and has a radial thickness equal to approximately half the radial thickness of said stack of transformer sheet rings.

7. A roller as claimed in claim 2, wherein each sheet of said stack has an axial thickness which depends upon the frequency of rotation of said roller and on the method of manufacture of said sheets.

8. A roller as claimed in claim 2, wherein each stack of said sheet has an axial thickness within a range of 0.5 to 10.0 mm.

9. A roller as claimed in claim 1, wherein said magnetic core has three pole shoes spaced from said shell by three corresponding effective air gaps and said magnetic flux passes through said three air gaps.

10. A roller as claimed in claim 9, further comprising a fourth air gap functioning as a protective air gap.

11. A roller as claimed in claim 9, wherein two of said pole shoes are in opposite relation and the third of said pole shoes is positioned substantially equidistantly from said two of said pole shoes, the magnetic flux producing the compensating force field passing principally through said third of said pole shoes.

12. A roller as claimed in claim 11, further comprising a plurality of parallel magnetizing coils for magnetizing one of said two of said pole shoes and a plurality of parallel magnetizing coils for magnetizing the other of said two of said pole shoes.

13. A roller as claimed in claim 12, further comprising deflection compensating means for compensating for deflection of said roller, said deflection compensating means including a source of electrical current, current conducting means for conducting current from said source to said magnetizing coils and adjusting means for adjusting the intensity of said current.

14. A roller as claimed in claim 9, wherein two of said air gaps are in opposite relation and substantially equal in thickness and the third of said air gaps has a greater thickness than either of said two of said air gaps and is positioned substantially equidistantly from said two of said air gaps.

15. A roller as claimed in claim 14, wherein a force field compensating for deflection of said roller passes principally through said third of said air gaps and said third of said air gaps has a greater thickness than deflection of said axle with maximum compensation.

16. A roller as claimed in claim 1, wherein said magnetic core has a cross-section of substantially T-shape with three pole shoes spaced from said shell by three corresponding effective air gaps and said magnetic flux passes through said three air gaps.

17. A roller as claimed in claim 1, wherein said magnetic core has a cross-section of substantially X-shape with three pole shoes spaced from said shell by three corresponding effective air gaps and said magnetic flux passes through said three air gaps.

* * * * *